(12) United States Patent
Couturier et al.

(10) Patent No.: US 12,134,246 B2
(45) Date of Patent: Nov. 5, 2024

(54) INTEGRATED AIR BARRIER ASSEMBLY

(71) Applicant: GCP Applied Technologies Inc., Cambridge, MA (US)

(72) Inventors: Marysusan Couturier, Framingham, MA (US); Jyoti Seth, Andover, MA (US); Damla Boyer, Medford, MA (US)

(73) Assignee: GCP Applied Technologies Inc., Alpharetta, GA (US)

( * ) Notice: Subject to any disclaimer, the term of this patent is extended or adjusted under 35 U.S.C. 154(b) by 485 days.

(21) Appl. No.: 16/770,171

(22) PCT Filed: Dec. 6, 2018

(86) PCT No.: PCT/US2018/064172
§ 371 (c)(1),
(2) Date: Jun. 5, 2020

(87) PCT Pub. No.: WO2019/113273
PCT Pub. Date: Jun. 13, 2019

(65) Prior Publication Data
US 2021/0162713 A1 Jun. 3, 2021

Related U.S. Application Data

(60) Provisional application No. 62/595,637, filed on Dec. 7, 2017.

(51) Int. Cl.
*B32B 15/04* (2006.01)
*B32B 5/18* (2006.01)
(Continued)

(52) U.S. Cl.
CPC .............. *B32B 15/046* (2013.01); *B32B 5/18* (2013.01); *B32B 15/20* (2013.01); *C09D 107/00* (2013.01);
(Continued)

(58) Field of Classification Search
CPC ... B32B 15/14; B32B 27/28; B32B 2260/046; B32B 13/06; B32B 13/14; B32B 15/10;
(Continued)

(56) References Cited

U.S. PATENT DOCUMENTS 2,314,449 A 3/1943 Hoggatt
4,541,880 A 9/1985 Arena et al.
(Continued)

FOREIGN PATENT DOCUMENTS

WO 2016178866 11/2016

OTHER PUBLICATIONS

Copenheaver, Form PCT/ISA/210, International Search Report for PCT/US2018/064172, Dated Feb. 22, 2019, 2 pages.
(Continued)

*Primary Examiner* — Kevin R Kruer
(74) *Attorney, Agent, or Firm* — Joseph D. Rossi

(57) ABSTRACT

An integrated air barrier assembly is provided as an integral product in which a fastener-sealing layer is secured between opposed surfaces of a board and an anti-blocking facing layer. The assembly exhibits good fastener sealability, including for larger self-drilling screws. The anti-blocking facing layer maintains the fastener-sealing layer inward of the environment and prevents blocking or sticking of the assembly when stacked. In some embodiments, the anti-blocking facing layer can be a metal film or foil, which can reflect heat away from the fastener-sealing layer, thereby maintaining a lower temperature on the fastener-sealing layer. In some embodiments, the board can be an insulating layer or wood layer. The assembly can be readily installed in a single step during construction.

23 Claims, 3 Drawing Sheets

(51) Int. Cl.
  B32B 15/20    (2006.01)
  C09D 107/00   (2006.01)
  C09D 109/06   (2006.01)
  C09D 111/00   (2006.01)
  C09D 127/06   (2006.01)
  C09D 127/08   (2006.01)
  C09D 133/08   (2006.01)
  C09D 163/00   (2006.01)
  C09D 175/02   (2006.01)
  C09D 175/04   (2006.01)
  C09D 183/06   (2006.01)
  C09D 195/00   (2006.01)
  E04B 1/66     (2006.01)
  E04C 2/26     (2006.01)

(52) U.S. Cl.
  CPC .......... *C09D 109/06* (2013.01); *C09D 111/00* (2013.01); *C09D 127/06* (2013.01); *C09D 127/08* (2013.01); *C09D 133/08* (2013.01); *C09D 163/00* (2013.01); *C09D 175/02* (2013.01); *C09D 175/04* (2013.01); *C09D 183/06* (2013.01); *C09D 195/005* (2013.01); *E04B 1/665* (2013.01); *E04C 2/26* (2013.01); *B32B 2255/102* (2013.01); *B32B 2255/26* (2013.01); *B32B 2266/0214* (2013.01); *B32B 2307/304* (2013.01); *B32B 2307/7242* (2013.01); *B32B 2307/7246* (2013.01); *B32B 2419/00* (2013.01); *E04B 2103/02* (2013.01); *E04B 2103/04* (2013.01)

(58) Field of Classification Search
  CPC ....... B32B 21/02; B32B 21/06; B32B 27/065; B32B 2307/7242; B32B 2307/7246; B32B 2419/00; B32B 5/024; B32B 2255/08; B32B 5/26; B32B 13/08; B32B 15/043; B32B 2260/021; B32B 2262/0253; B32B 2262/0276; B32B 2262/101; B32B 2266/0228; B32B 2307/724; B32B 5/022; B32B 5/245; B32B 5/32; B32B 15/046; B32B 5/18; B32B 15/20; B32B 2255/102; B32B 2255/26; B32B 2266/0214; B32B 2307/304; B32B 27/08; B32B 27/10; B32B 27/12; B32B 27/302; B32B 29/02; B32B 2255/12; B32B 2307/732; B32B 2607/00; B32B 11/04; B32B 27/06; B32B 29/005; B32B 29/007; C09D 107/00; C09D 109/06; C09D 111/00; C09D 127/06; C09D 127/08; C09D 133/08; C09D 163/00; C09D 175/02; C09D 175/04; C09D 183/06; C09D 195/005; E04B 1/665; E04B 2103/02; E04B 2103/04; E04C 2/26

See application file for complete search history.

(56) References Cited

U.S. PATENT DOCUMENTS

| | | | |
|---|---|---|---|
| 6,737,155 | B1 | 5/2004 | Ou |
| 6,901,712 | B2 | 6/2005 | Lionel |
| 7,144,632 | B2 | 12/2006 | Hayes |
| 8,215,083 | B2 | 7/2012 | Toas et al. |
| 2004/0137813 | A1 | 7/2004 | Faucher |
| 2008/0196351 | A1 | 8/2008 | Seth |
| 2011/0274865 | A1 | 11/2011 | Couturier et al. |
| 2014/0272404 | A1 | 9/2014 | Shake et al. |
| 2017/0051179 | A1 | 2/2017 | Johnson et al. |
| 2017/0191257 | A1 | 7/2017 | Ciuperca |

OTHER PUBLICATIONS

Copenheaver, Form PCT/ISA/237, Written Opinion of the International Searching Authority for PCT/US2018/064172, Dated Feb. 22, 2019, 7 pages.

INTEGRATED AIR BARRIER ASSEMBLY

CROSS REFERENCE TO RELATED APPLICATIONS

N/A

STATEMENT REGARDING FEDERALLY SPONSORED RESEARCH OR DEVELOPMENT

N/A

BACKGROUND

As energy costs continue to increase, building codes are requiring new commercial buildings to become more energy efficient. The 2015 International Energy Conservation Code (IECC) requires continuous insulation on all commercial buildings except those located in zones 2B of the North America climate map. This code also requires the building envelope to be completely sealed and meet the minimum air leakage requirements of ASTM Test Methods E 2178 (2003), E 2357 (2001), or E 779 (2010) of ASTM International. Air barriers have been used to achieve this minimum air leakage. Per the Air Barrier Association of America, air barriers are materials that can be used anywhere in an assembly to stop air infiltration or exfiltration. They can also function to resist liquid water, thereby providing a weather resistive barrier. By minimizing the infiltration and exfiltration of air, HVAC costs can be significantly reduced. The use of air barriers can also increase the durability of the building by minimizing the amount of moisture transported with air.

Air barriers must have an air permeance of not greater than 0.02 L/sec-m$^2$ at a pressure difference of 75 Pa as measured by ASTM Test Method 2178 (2003). Since this test method uses a pressure differential up to 300 Pa, an air barrier must be able to resist leakage up to 300 Pa. An air barrier assembly must have an air permeance of not greater than 0.2 L/sec-m$^2$ at a pressure differential of 75 Pa as measured by ASTM Test Method 2357 (2001).

In typical construction, the exterior wall is formed of gypsum board attached to studs or a concrete masonry unit (CMU) back up wall. The air barrier is placed over the gypsum board or CMU on the exterior side. A continuous insulation layer is applied over the air barrier. External cladding is then placed over the insulation. The insulation protects the air barrier from the temperature extremes of the outside unconditioned space. Prolonged exposure to elevated temperatures can lessen the durability of the air barrier. Thus, by placing the insulation over the air barrier, the air barrier durability can be lengthened. However, this practice requires multiple steps-installing the sheathing, installing the air barrier, installing the insulation, and installing the exterior cladding. In some cases, the insulation board is provided with an aluminum foil layer. However, the cladding fasteners penetrate the foil layer and the insulation and form entry points for air leakage.

It is known to supply a rigid insulation board with an air barrier in one product. However, the air barrier must be soft and flexible enough to seal around the shaft of a fastener, including large fasteners such as self-drilling screws. This attribute can cause the boards to block or stick together when stacked during storage and shipping and can cause damage during installation.

SUMMARY

An integrated air barrier assembly is provided that exhibits both good blocking resistance and good fastener sealability, including around large fasteners such as self-drilling screws, to serve as an air barrier. In particular, the integrated air barrier assembly provides a fastener-sealing layer interposed between a board and an anti-blocking facing layer. The fastener-sealing layer is a liquid applied coating composition that can remain soft enough to seal around fasteners, including self-drilling screws. The anti-blocking facing layer maintains the fastener-sealing layer inward of the environment and prevents blocking or sticking of the assembly when stacked. In some embodiments, the anti-blocking facing layer can be a metal film or foil, which can reflect heat away from the fastener-sealing layer, thereby maintaining a lower temperature on the fastener-sealing layer. The board can in some embodiments be an insulating layer and/or sheathing. The assembly can be readily installed in a single step during construction.

More particularly, in some embodiments, an integrated air barrier assembly is provided having a board including a first surface and a second surface. A fastener-sealing layer comprising a liquid-applied coating composition is adhered on one of the first surface or the second surface of the board. The fastener-sealing layer has a glass transition temperature of equal to or less than 40° F., preferably equal to or less than 25° F., and more preferably equal to or less than 20° F., and a thickness ranging from 1 mils to 50 mils and preferably 2 to 25 mils. An anti-blocking facing layer is adhered on a surface of the fastener-sealing layer opposite the board. The anti-blocking facing layer can be chosen from a fiberglass mat, an aluminum foil, a fabric layer, and a paper layer. The board can be chosen from an insulating layer, wood layer, gypsum board, concrete masonry unit, or cementitious board.

In some embodiments, the integrated air barrier assembly can be installed onto wall or roof panels or can form the wall or roof panels that are attached to framing or other structural support elements of a building structure. The assembly can be fastened onto the exterior side or the interior side of a wall or roof, depending on the application.

DESCRIPTION OF THE DRAWINGS

Reference is made to the following detailed description taken in conjunction with the accompanying drawings in which.

DETAILED DESCRIPTION

Figure 1:
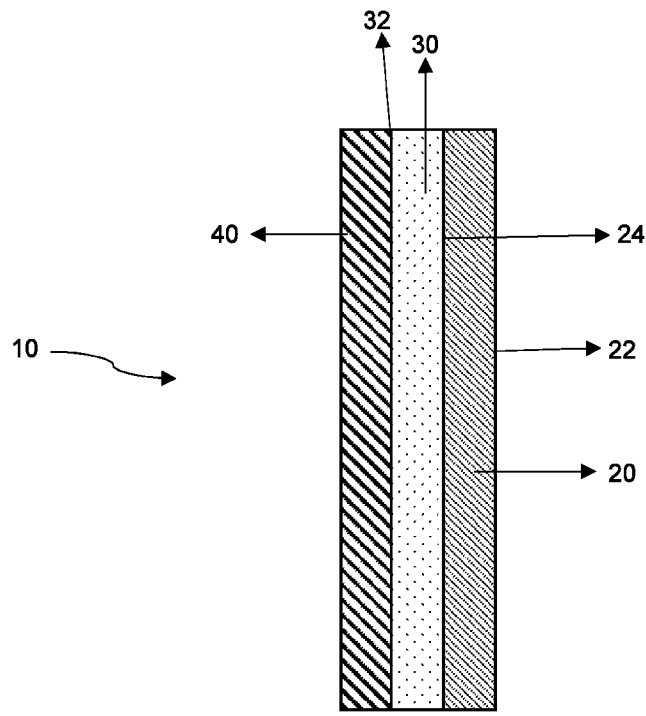
FIG. 1 is a schematic illustration of an embodiment of an integrated air barrier assembly.

Referring to FIG. 1, embodiments of an integrated air barrier assembly 10 include a board 20 having a first surface 22 and a second surface 24. A fastener-sealing layer 30 is secured on one of the first surface or the second surface of the board 20, which can provide a supporting substrate for the fastener-sealing layer. An anti-blocking facing layer 40 is secured on a surface 32 of the fastener-sealing layer 30, such that the fastener-sealing layer is disposed between the board 20 and the anti-blocking facing layer 40. The composition of the fastener-sealing layer 30, the materials of the anti-blocking facing layer 40 and the board 20, and the placement of the integrated barrier assembly 10 within a building structure can be selected to enhance the performance and durability of the assembly within the building structure, as described further below.

For example, in a typical steel framed building construction, the exterior sheathing and cladding are fastened to steel studs using self-drilling screws. Self-drilling screws have a shape of a drill bit on the front or tip which causes a much bigger opening than a nail head. The larger opening is more difficult to seal against and is a major point for air leakage.

Figure 2:
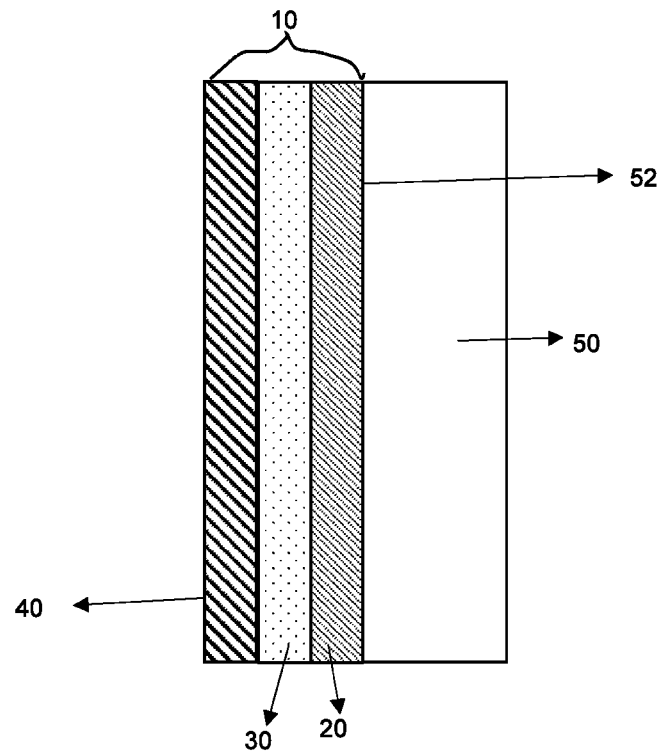
FIG. 2 is a schematic illustration of the integrated air barrier assembly of FIG. 1 installed onto a wall.
Figure 3:
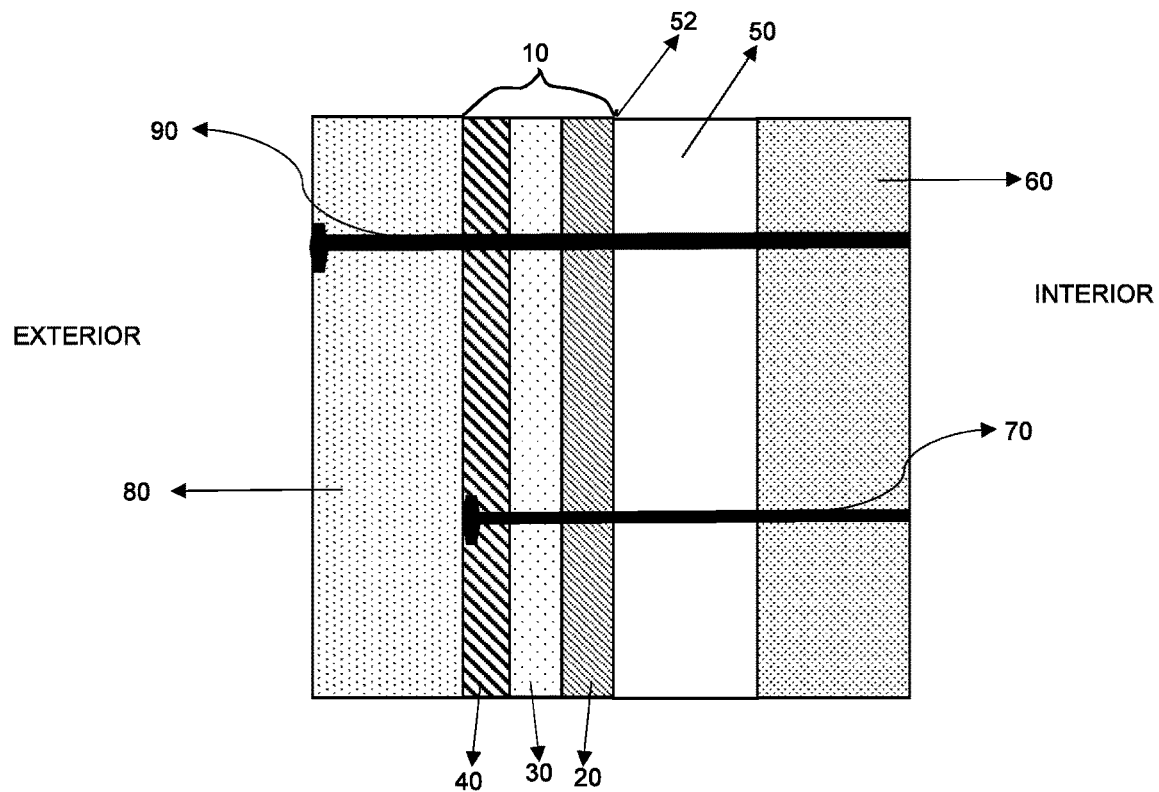
FIG. 3 is a schematic illustration of a wall including the integrated air barrier assembly of FIG. 1.

Accordingly, referring to FIGS. 2 and 3, in some embodiments, the integrated barrier assembly 10 can be attached as an integral product to an exterior surface 52 of sheathing 50 that has been installed on structural support elements 60 of a building structure. The integrated barrier assembly 10 can be attached to the sheathing 60 with suitable fasteners 70, such as screws, including self-drilling screws, nails, staples, or tacks, or a combination thereof. The board 20 of the integrated barrier assembly 10, which may be an insulating layer, is placed adjacent the sheathing 60. The sheathing 60 can be, for example, gypsum board, a concrete masonry unit, or a cementitious board. Providing an insulating layer and a fastener-sealing layer as an integral assembly 10 can save time in installation. Cladding 80 can then be installed by securing fasteners 90 through the integrated barrier assembly and the sheathing and into the framing. The integrated barrier assembly 10 ensures that good fastener sealability can be maintained.

The fastener-sealing layer 30 is a liquid-applied coating composition that can remain soft enough to seal around a fastener, including self-drilling screws, at temperatures encountered during construction, such as temperatures down to 25° F. Suitable fastener-sealing layer materials can be chosen from latexes such as acrylic, vinyl acrylic, styrene acrylate, vinyl acetate, styrene-butadiene, carboxylated styrene-butadiene, vinylidene chloride, asphaltic emulsions, natural rubber, butyl, chloroprene, vinyl chloride-ethylene, and polyvinylidene chloride (PVDC).

In some embodiments, to be able to form a film at temperatures above 40° F., the glass transition temperature, $T_g$, of the liquid-applied coating composition should equal to or less than 40° F., preferably equal to or less than 25° F., and more preferably equal to or less than 20° F. If the $T_g$ is greater than 40° F., a plasticizer can be added to soften the latex particles so that they will coalesce, and ensure they will be soft above 40° F. Suitable plasticizers can include phthalates, benzoate esters, polyethers, polyesters, adipates, polyetheramines, polyols, or epoxidized soybean oil. Suitable liquid-applied air barriers include, for example, PERM-A-BARRIER® VP and PERM-A-BARRIER® NPL, NPL 10, commercially available from GCP Application Technologies Inc. of Cambridge, MA.

In some embodiments, a liquid fastening layer can be applied as a hot melt, in which a composition is heated to reduce its viscosity to liquid form for application. Hot melt chemistry can include polyolefins, ethylene vinyl acetates, polyamides, polyurethanes, asphaltics, butyls, and acrylics. Combinations of such compositions can be used to achieve optimum properties needed to seal around the fastener.

In some embodiments, the fastener-sealing layer can be applied as a low molecular weight liquid that crosslinks to form a solid coating. Crosslinking can be achieved via moisture cure or reactive chemistry such as polyurethanes, polyureas, acrylics, silicones, silyl terminated polyethers, and epoxies. Combinations of such compositions can be used to achieve optimum properties.

A liquid-applied coating composition for the fastener-sealing layer can be readily applied over a board in a manufacturing operation. The coating composition can be applied in any suitable manner, such as by spraying, rolling, die coating, curtain coating, transfer coating, and extrusion. In some embodiments, the fastener-sealing layer can have a thickness between 1 and 50 mils and more preferably between 2 and 25 mils.

The attribute of softness, while good for fastener sealability, can however cause difficulties. Because the liquid-applied coating composition is soft enough to seal around a self-drilling screw, it may not be able to withstand stacking pressures during storage and shipping. This can cause the boards 20 to block or stick together when stacked and may cause damage during installation. Accordingly, the anti-blocking facing layer 40 is placed over the fastener-sealing layer 30, which maintains the fastener-sealing layer inward of the environment. The anti-blocking facing layer 40 should be solid below at least 160° F. to avoid the blocking or sticking problems that are associated with the liquid-applied coating composition. In some embodiments, the anti-blocking facing layer 40 can provide blocking resistance such that, if at least two of the integrated barrier assemblies 10 were stacked on top of each other, the stacked assemblies would not become blocked when subjected to a pressure of 60 lb/in$^2$, under a static load for 24 hours at a temperature within the range of 60° F. to 72° F. (and more preferably within 50° F. to 90° F., and still more preferably within the range of 40° F. to 120° F.).

In some embodiments, the anti-blocking facing layer 40 can include a material, such as a metal foil or film, such as an aluminum foil, that can also reflect heat away from the fastener-sealing layer. In some embodiments, the anti-blocking facing layer can be a fiberglass mat. In some embodiments, the fiberglass mat can include E glass fibers or S glass fibers or a combination thereof. The glass fibers can be embedded in a resin matrix. In some embodiments, the resin matrix can be a thermoset resin or a thermoplastic resin. In some embodiments, the resin matrix can be chosen from a latex resin, polyester resin, amino resin, formaldehyde resin, or epoxy resin, or a combination thereof. In some embodiment, the fiberglass mat can include an ultraviolet radiation blocker, such as titanium dioxide. In some embodiments, UV absorbers such as benzophenones, benzotriazoles and triazines may also be used. UV stabilizers such as hindered amines and benzoates could also be employed. Combinations of a UV radiation blocker, UV absorber, and/or UV stabilizer can be used.

In some embodiments, the anti-blocking facing layer can be a fabric layer. In some embodiments, the fabric layer can be chosen from a woven material, a non-woven material, a felt material, a spun bond material. In some embodiments, the fabric layer can be chosen from a polyethylene, polypropylene, or polyester fabric or a combination thereof.

In some embodiments, the anti-blocking facing layer can be a paper or a coated paper, for example, a resin impregnated fiber overlay paper or kraft paper. Examples of coated paper can be found in, for example, U.S. Pat. Nos. 4,541,880 and 6,737,155.

Another difficulty created by placing the fastener-sealing layer 30 on the outward side of a board 20 that also serves an insulating layer is that, in this location, the composition of the fastener-sealing layer may not be adequately protected from temperature swings of the environment. For example, the air space behind a metal cladding panel in the U.S. desert southwest can easily reach 160° F. during the day. Thermal cycling and extended periods at elevated temperatures can lessen the lifetime of polymers and increase oxidation reactions, which can lead to degradation of the polymer chains. Thus, as noted above, in some embodiments, the anti-blocking facing layer 40 can include a material, such as a metal foil or film, that can also reflect heat away from the fastener-sealing layer. Aluminum is a suitable metal foil for the anti-blocking facing layer, because it has an inert surface and the liquid-applied composition of the fastener-sealing layer can readily adhere to it. Additionally, aluminum foil has a high reflectivity and can provide a radiant barrier to direct thermal radiation away from the fastener-sealing layer, which can help enhance the insulation R value. In some embodiments, the aluminum foil can have a thickness of 0.025 mm to 0.5 mm, preferably 0.025 mm to 0.38 mm, and more preferably 0.025 mm to 0.30 mm. To aid in handling, the aluminum layer can be laminated to a polyolefin film such as polyethylene or polypropylene.

Figure 4:
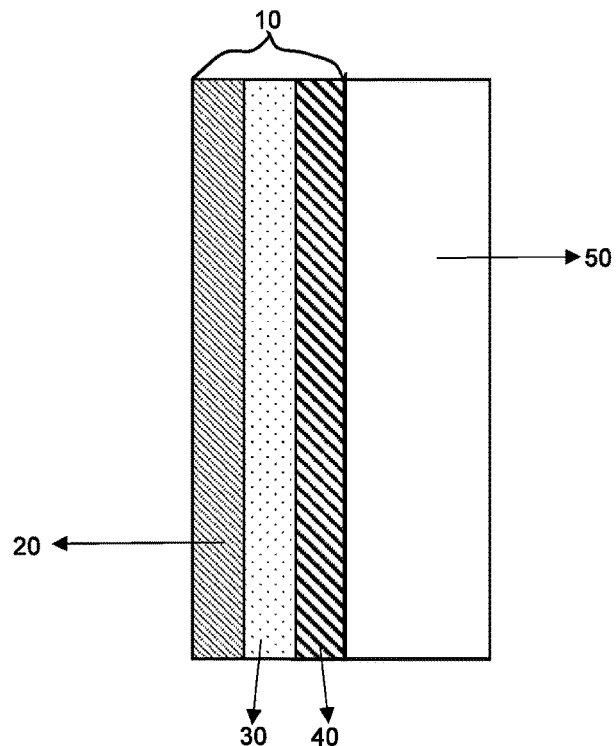
FIG. 4 is a schematic illustration of a further embodiment of an integrated air barrier assembly.

In still further embodiments, referring to FIG. 4, the integrated barrier assembly 10 can be attached to an exterior surface of sheathing with the anti-blocking facing layer 40 placed adjacent the sheathing 50 and the board 20 serving as an insulating layer facing the external portion of the wall. The insulation is now external to the fastener-sealing layer 30, thereby protecting it from external temperature conditions. The fastener-sealing layer 30 can still provide good fastener sealability.

As noted above, in some embodiments, the board 20 can be an insulating layer to provide exterior thermal insulation. A number of different insulating materials can be used for the insulating layer. In some embodiments, the insulating material can be a polyisocyanurate, an expanded polystyrene, or an extruded polystyrene. Polystyrene is commercially available as a rigid board and is the least expensive; however, it cannot be used with all cladding types due to its low melting point and fire performance. Polyisocyanurate is also commercially available as a rigid board, but is generally more expensive than polystyrene. In some embodiments, the insulating layer can have an R-value of at least 1. In some embodiments, the insulating layer can have an R-value of at least 3. In some embodiments, the insulating layer can have an R-value ranging from 1 to 10. In some embodiments, the insulating layer can have a thickness ranging between 0.5 and 4 inches.

Figure 5:
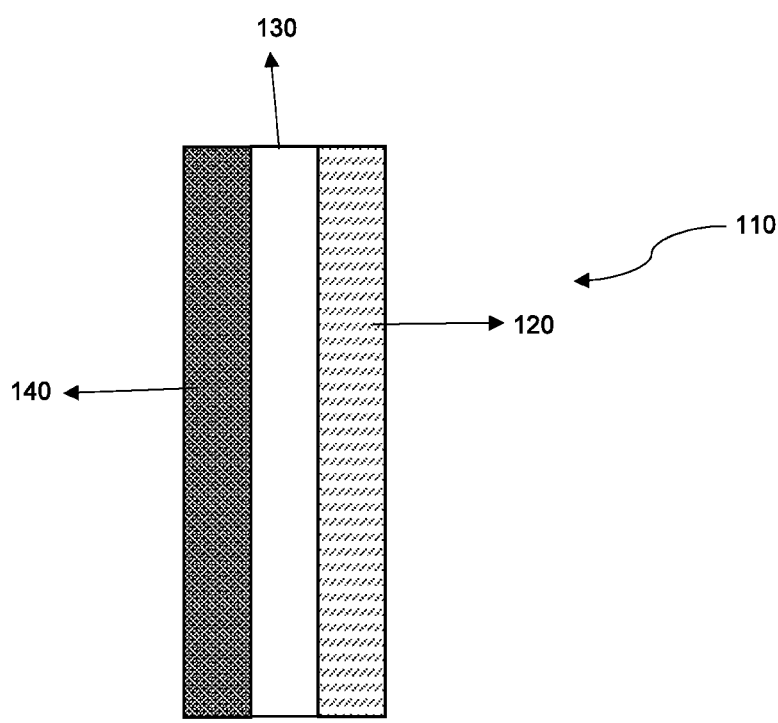
FIG. 5 is a schematic illustration of a still further embodiment of an integrated air barrier assembly.

Referring to FIG. 5, in some embodiments, an integrated air barrier assembly 110 can include a board 120 that can be a wood layer, and a fastener-sealing layer 130 under an anti-blocking facing layer 140 can be applied onto a surface of the wood layer. In some embodiments, the wood layer can be chosen from oriented strand board, plywood, particle board, chip board, medium density fiberboard, wafer board, wood particles in laminate or non-laminate form, composites of strands and ply veneers, or composites of wood chips. In some embodiments, an anti-blocking facing layer 140 suitable for use with a wood layer can be paper or fabric. The anti-blocking facing layer can be coated or saturated with a water resistant resin and can be positioned as an outer layer that becomes a liquid water resistant layer. The anti-blocking facing layer can also be vapor permeable or breathable. However, such an anti-blocking facing layer can be hard and cannot seal against air leakage through penetrations created by cladding fasteners that puncture this layer and the wood board, creating a path for air leakage. Thus, the fastener-sealing layer 130 between the water resistant anti-blocking facing layer 140 and the wood layer 120 provides for air sealing around penetrations.

The integrated air barrier assembly 10, 110 can be configured to achieve a desired water vapor permeance, which can depend on the application or particular building structure. For example, in some embodiments, the integrated barrier assembly can form a water vapor impermeable barrier. In some embodiments, the integrated barrier assembly can have a water vapor permeance less than 1 perm at a temperature of 23° C. and a relative humidity of 100% on one side and 50% on an opposite side, as measured by ASTM Test Method E 96 B (2010). In some embodiments, the integrated barrier assembly can form a vapor permeable or breathable barrier. In some embodiments, the integrated barrier assembly can have a water vapor permeance of greater than 10 perms at a temperature of 23° C. and a relative humidity of 100% on one side and 50% on an opposite side, as measured by ASTM Test Method E 96 B (2010).

In some embodiments, the integrated air barrier assembly can have an air leakage rate of greater than 75 Pa, preferably greater than 300 Pa, and more preferably greater than 800 Pa, as measured by ASTM Test Method E 1186 (2003).

In some embodiments, the integrated air barrier assembly can have an air leakage of less than 0.02 L/sec-m$^2$ as measured by ASTM Test Method E 2178 (2003) at a pressure difference of 75 Pa.

Embodiments of the integrated air barrier assembly described herein are particularly suitable for providing fastener sealability against screws, and more particularly against self-drilling screws. It will be appreciated that embodiments can provide fastener sealability against a variety of types of fasteners, including screws, nails, staples or tacks, or a combination thereof. In some embodiments, the integrated barrier assembly can provide good nail sealability as tested using ASTM Test Method D 1970 (2013).

Embodiments of the integrated air barrier assembly as described herein can form or be incorporated into a sheathing system for a building structure. In some embodiments, a sheathing system can include a wall or roof panel having an interior surface and an exterior surface. An integrated barrier assembly as described herein can be secured to one of the exterior surface or the interior surface of the wall or roof panel. The wall or roof panel can be, for example, gypsum board, a concrete masonry unit, or a cementitious board. The integrated barrier assembly can be secured to the wall or roof panel with any suitable fasteners, such as screws, which can be self-drilling screws, nails, staples, of tacks, or a combination thereof.

In some embodiments, the board of the integrated air barrier assembly can itself serve as sheathing for the building structure in which the assembly is installed. The board can be, for example, a gypsum board, a concrete masonry unit, or a cementitious board. The integrated barrier assembly can thus serve as a wall or roof panel and can be fastened to structural support elements of the building structure using suitable fasteners, as described above. Structural support elements can includes, for example, framing elements such as studs or rafters or structural wall or roof panels.

In some embodiments, a building structure can be provided including structural support elements and at least two integrated barrier assemblies as described herein supported by the structural support elements. In some embodiments, at least two integrated barrier assemblies can be disposed adjacent to each other with transverse edges proximately located to define a joint therebetween. A tape or a liquid-applied coating or a combination thereof can be applied to the joint between the adjacent integrated barrier assemblies to seal the joint.

In some embodiments, a method of sheathing an exterior wall or roof of a building is provided. The method can include fastening one or more integrated barrier assemblies as described herein to framing elements or other structural elements of the building. In some embodiments, the method can include installing one or more wall or roof panels as sheathing to structural support elements of a building construction, and attaching one or more integrated barrier assemblies to the one or more wall or roof panels. The integrated air barrier assemblies can be fastened to an exterior surface or an interior surface of the wall or roof panels. The board of the integrated air barrier assembly can be an insulating panel. It will be appreciated that, in the final construction, one or more additional layers of insulation (not shown) can be used to achieve a desired R value, such as a minimum R value defined by an applicable building code. Such additional insulation layers can be any suitable type of insulation, such as, for example, rigid insulation boards. An exterior cladding layer can be installed over the integrated barrier assemblies and any additional insulation layers if present.

The integrated air barrier assembly can be manufactured in any suitable manner. Both the fastener-sealing layer and the anti-blocking facing layer can be applied to the board to form an integral assembly. In some embodiments, the fastener-sealing layer can be applied as a liquid composition above its glass transition temperature, for example by spraying or roller application. The anti-blocking facing can be laid over the composition of the fastener-sealing layer. The liquid-applied composition can adhere to the board and to the anti-blocking facing layer. The anti-blocking facing layer can be applied to the liquid coating of the fastener-sealing layer or can be post-laminated after the coating has solidified. The integrated air barrier assembly can be manufactured in a factory or other off site location where conditions can be readily controlled. The integrated air barrier assembly can be installed as a single item in the field to the sheathing and/or to the structural support elements of a building structure during construction.

Example 1

An integrated air barrier assembly incorporating an insulating layer as the board was tested for air leakage and compared to insulative sheathing alone using ASTM Test Method E 1186 (2003). Several sheathing and insulation configurations were assembled and fastened with a 3" self-drilling screw into a steel stud. The configurations of Tests 1-3 are prior art configurations, and the configuration of Test 4 is an integrated barrier assembly as described herein. The sheathing of Test 1 was a commercially available glass mat-faced exterior gypsum sheathing board. Tests 2-4 each used polyisocyanurate rigid foam board insulation ("polyiso board"). In Test 2, the polyiso board was faced with an aluminum foil layer. In Test 3, a 25 mil fluid-applied composition was added to an aluminum foil-faced polyiso board. In Test 4, the integrated barrier assembly included an aluminum foil-faced polyiso board with a 25 mil vapor impermeable fastener-sealing layer and aluminum film as the anti-blocking facing layer on top of the fastener-sealing layer. In Tests 3 and 4, the glass transition temperature, $T_g$, of the fluid applied composition was −26° C. (−14.8° F.). For all tests, the ambient temperature was 27° C. (81° F.). Results are shown in Table 1.

TABLE 1

Air Leakage Test

| Test | Configuration Tested | Air Leakage Pressure, Pa |
|---|---|---|
| 1 | fiberglass mat gypsum sheathing | 92 |
| 2 | Al foil-faced polyiso board | 251 |
| 3 | Al foil-faced polyiso board with 25 mils fluid applied composition | 273 |
| 4 | Al foil-faced polyiso board with 25 mils vapor impermeable fluid-applied fastener-sealing layer and aluminum film on top of fluid-applied fastener-sealing layer | >900 |

Unexpectedly, the combination of the fastener-sealing layer and aluminum film anti-blocking facing layer over the polyiso board insulation in Test 4 resulted in significantly better air sealing around the fastener. By placing the aluminum film over the fastener-sealing layer, air leakage past the self-drilling screw was reduced by greater than 200%. The combination of soft fastener-sealing layer and the malleable film of the anti-blocking facing layer worked synergistically.

Example 2

An integrated air barrier assembly incorporating wood sheathing as the board was tested for air leakage and compared to the wood sheathing alone using ASTM Test Method E 1186 (2003). The configurations were arranged in a simulated residential construction in which vinyl siding cladding would be employed. In this simulated construction, when the integrated barrier assembly and the wood sheathing alone were nailed to a stud, the nails were not installed flush with the wood sheathing, but were offset to allow for expansion and contraction of the vinyl. In a first test, the nail was installed flush with the wood sheathing and into the stud. In a second test, the nail was installed offset from the wood sheathing and into the stud. In a third test, the nail was installed offset from the wood sheathing and not hitting the stud. The wood sheathing used was a commercially available laminated oriented strand board. The data were obtained at an ambient temperature of 23° C. (73° F.). Results are shown in Table 2.

TABLE 2

Air Leakage

| | | Depressurization pressure, Pa | |
|---|---|---|---|
| Test Number | Nail installation | Wood Sheathing alone | Aluminum facing layer over 25 mils fluid applied fastener-sealing layer on wood sheathing |
| 1 | Nail flush with wood sheathing and into stud | >800 | >800 |
| 2 | Nail offset wood sheathing and into stud | >800 | >800 |
| 3 | Nail offset wood sheathing and not hitting stud | Leaked at 400-450 | >800 |

The results show that when the nail punctured the board, it can create an entry or exit point for air leakage. Adding the fastener-sealing layer on top of the board reduced the air leakage, as indicated in Test No. 3.

Example 3

Wood has higher coefficient of thermal expansion than gypsum board, and woods boards are typically used on the external wall in residential construction. Thus, the configurations used in Example 2 were also tested after the wood boards were left outside overnight. The low temperature during the night was 3° C. (37° F.). The ambient temperature for this test was 9° C. (48° F.). Results are shown in Table 3.

TABLE 3

| | | Air Leakage | |
| --- | --- | --- | --- |
| | | Depressurization pressure, Pa | |
| Test Number | Nail installation | Wood Sheathing alone | Aluminum facing layer over 25 mils fluid applied fastener-sealing layer on wood sheathing |
| 4 | Nail flush with wood sheathing and into stud | >800 | >800 |
| 5 | Nail offset wood sheathing and into stud | >800 | >800 |
| 6 | Nail offset wood sheathing and not hitting stud | Leaked at 350-400 | >800 |

The results show that at colder temperatures, the penetrations expanded and increased paths for air leakage. Adding the fastener-sealing layer on the wood board reduced the air leakage, as indicated in Test No. 6.

Other aspects of an integrated air barrier assembly include the following:

1. An integrated air barrier assembly comprising:
   a board including a first surface and a second surface;
   a fastener-sealing layer comprising a liquid-applied coating composition adhered on one of the first surface or the second surface of the board, the fastener-sealing layer having a glass transition temperature of equal to or less than 40° F. and a thickness ranging from 1 mils to 50 mils; and
   an anti-blocking facing layer adhered on a surface of the fastener-sealing layer opposite the board, wherein the anti-blocking facing layer is chosen from a fiberglass mat, an aluminum foil, a fabric layer, of a paper layer or a combination thereof.
2. The integrated air barrier assembly of embodiment 1, wherein the assembly comprises a water vapor impermeable barrier.
3. The integrated air barrier assembly of any of embodiments 1-2, wherein the assembly has a water vapor permeance less than 1 perm at a temperature of 23° C. and a relative humidity of 100% on one side and 50% on an opposite side, as measured by ASTM Test Method E 96 B (2010).
4. The integrated air barrier assembly of embodiment 1, wherein the assembly comprises a vapor permeable barrier.
5. The integrated air barrier assembly of any of embodiments 1 and 4, wherein the assembly has a water vapor permeance of greater than 10 perms at a temperature of 23° C. and a relative humidity of 100% on one side and 50% on an opposite side, as measured by ASTM Test Method E 96 B (2010).
6. The integrated air barrier assembly of any of embodiments 1, 4, and 5, wherein the assembly has an air leakage of less than 0.02 L/sec-m$^2$ as measured by ASTM Test Method E 2178 (2003) at a pressure difference of 75 Pa.
7. The integrated air barrier assembly of embodiment 1, wherein the assembly has an air leakage rate of greater than 75 Pa as measured by ASTM Test Method E 1186 (2003).
8. The integrated air barrier assembly of any of embodiments 1 and 7, wherein the assembly has an air leakage rate of greater than 300 Pa as measured by ASTM Test Method E 1186 (2003).
9. The integrated air barrier assembly of any of embodiments 1, 7 and 8, wherein the assembly has an air leakage rate of greater than 800 Pa as measured by ASTM Test Method E 1186 (2003).
10 The integrated air barrier assembly of any of embodiments 1-9, wherein the fastener-sealing layer seals a penetration formed by a self-driving screw.
11. The integrated air barrier assembly of any of embodiments 1-10, wherein the fastener-sealing layer is chosen from a liquid-applied latex, acrylic, vinyl acrylic, styrene acrylate, vinyl acetate, styrene-butadiene, carboxylated styrene-butadiene, vinylidene chloride, asphaltic emulsion, natural rubber, butyl, chloroprene, vinyl chloride-ethylene, and polyvinyl chloride.
13. The integrated air barrier assembly of embodiment 11, wherein the fastener-sealing layer includes a plasticizer chosen from a phthalate, benzoate ester, polyether, polyester, adipate, polyetheramine, polyol, or epoxidized soybean oil, or a combination thereof.
12. The integrated air barrier assembly of any of embodiments 1-10, wherein the fastener-sealing layer is a composition applied as a hot melt, wherein the hot melt composition is chosen from a polyolefin, ethylene vinyl acetate, polyamide, polyurethane, asphaltic, butyl, or acrylic, or a combination thereof.
14. The integrated air barrier assembly of any of embodiments 1-10, wherein the fastener-sealing layer is a composition applied as a low molecular weight liquid that crosslinks to form a solid coating.
15. The integrated air barrier assembly of embodiment 14, wherein the composition is chosen from a polyurethane, polyurea, acrylic, silicone, silyl terminated polyether, or epoxy, or a combination thereof.
16. The integrated air barrier assembly of any of embodiments 1-15, wherein the fastener-sealing layer has a thickness ranging from 2 mils to 25 mils.
17. The integrated air barrier assembly of any of embodiments 1-16, wherein the fastener-sealing layer has a glass transition temperature of equal to or less than 25° F.
18. The integrated air barrier assembly of any of embodiments 1-17, wherein the fastener-sealing layer has a glass transition temperature of equal to or less than 20° F.
19. The integrated air barrier assembly of any of embodiments 1-18, wherein the anti-blocking facing layer is solid below at least 160° F.
20. The integrated air barrier assembly of any of embodiments 1-19, wherein the fiberglass mat of the anti-blocking facing layer comprises E glass fibers or S glass fibers embedded in a resin matrix.
21. The integrated air barrier assembly of embodiment 20, wherein the resin matrix is chosen from a thermoset resin, thermoplastic resin, latex resin, polyester resin, amino resin, formaldehyde resin, or epoxy resin, or a combination thereof.

22. The integrated air barrier assembly of any of embodiments 1-21, wherein the aluminum foil of the anti-blocking facing layer has a thickness of 0.025 mm to 0.5 mm.

23. The integrated air barrier assembly of any of embodiments 1-22, wherein the aluminum foil of the anti-blocking facing layer has a thickness of 0.025 mm to 0.38 mm.

24. The integrated air barrier assembly of any of embodiments 1-23, wherein the aluminum foil of the anti-blocking facing layer has a thickness of 0.025 mm to 0.3 mm.

25. The integrated air barrier assembly of any of embodiments 1-24, wherein the anti-blocking facing layer comprises a radiant barrier disposed to redirect thermal radiation away from the fastener-sealing layer.

26. The integrated air barrier assembly of any of embodiments 1-25, wherein the paper layer of the anti-blocking facing layer is a coated paper.

27. The integrated air barrier assembly of any of embodiments 1-26, wherein the fabric layer of the anti-blocking facing layer is chosen from a woven material, a non-woven material, a felt material or a spun bond material.

28. The integrated air barrier assembly of any of embodiments 1-27, wherein the fabric layer of the anti-blocking facing layer is chosen from a polyethylene, polypropylene, or polyester non-woven fabric.

29. The integrated air barrier assembly of any of embodiments 1-28, wherein the board comprises an insulating layer having an R-value of at least 1.

30. The integrated air barrier assembly of any of embodiments 1-29, wherein the board comprises an insulating layer having an R-value of at least 10.

31. The integrated air barrier assembly of any of embodiments 1-29, wherein the board comprises an insulating layer having an R-value in a range of 1 to 10.

32. The integrated air barrier assembly of any of embodiments 29-31, wherein the insulating layer comprises an insulating material chosen from a polyisocyanurate, expanded polystyrene, or extruded polystyrene, or a combination thereof.

33. The integrated air barrier assembly of any of embodiments 29-32, wherein the insulating layer has a thickness ranging between 0.5 and 4 inches.

34. The integrated air barrier assembly of any of embodiments 1-33, wherein the board comprises a wood layer.

35. The integrated air barrier assembly of embodiment 34, wherein the wood layer is chosen from oriented strand board, plywood, particle board, chip board, medium density fiberboard, wafer board, wood particles in laminate or non-laminate form, composites of strands and ply veneers, or composites of wood chips.

36. The integrated air barrier assembly of any of embodiments 1-35, wherein the board is chosen from a gypsum board, a concrete masonry unit, or a cementitious board.

37. A sheathing system for a building structure, comprising:
a wall or roof panel having an interior surface and an exterior surface; and
the integrated air barrier assembly of embodiment 1 secured to one of the exterior surface or the interior surface of the wall or roof panel.

38. The sheathing system of embodiment 37, wherein the integrated air barrier assembly is secured to the wall or roof panel with the board adjacent the exterior surface of the wall or roof panel.

39. The sheathing system of any of embodiments 37-39, wherein the integrated air barrier assembly is secured to the wall or roof panel with the anti-blocking facing layer adjacent the exterior surface of the wall or roof panel.

40. The sheathing system of any of embodiments 37-39, wherein the integrated air barrier assembly comprises a vapor impermeable barrier.

41. The sheathing system of embodiment 40, wherein the vapor impermeable barrier has a water vapor permeance less than 1 perm at a temperature of 23° C. and a relative humidity of 100% on one side and 50% on an opposite side, as measured by ASTM Test Method E 96 B (2010).

42. The sheathing system of any of embodiments 37-39, wherein the integrated air barrier assembly comprises a vapor permeable barrier.

43. The sheathing system of embodiment 42, wherein the vapor permeable barrier has a water vapor permeance greater than 10 perms at a temperature of 23° C. and a relative humidity of 100% on one side and 50% on an opposite side, as measured by ASTM Test Method E 96 B (2010).

44. The sheathing system of any of embodiments 37-43, wherein the wall or roof panel is gypsum board, a concrete masonry unit, or a cementitious board.

45. The sheathing system of any of embodiments 37-44, wherein the integrated air barrier assembly is secured to the wall or roof panel by fasteners chosen from screws or nails or a combination thereof.

46. A building structure comprising:
structural support elements; and
at least two integrated air barrier assemblies of embodiment 1 supported by the structural support elements.

47. The building structure of embodiment 46, further comprising one or more wall or roof panels attached to the structural support elements, the at least two integrated air barrier assemblies fastened to the one or more wall or roof panels.

48. The building structure of any of embodiments 46-47, wherein the at least two integrated air barrier assemblies are disposed adjacent to each other with transverse edges proximately located to define a joint therebetween, and further comprising a tape or a liquid-applied coating or a combination thereof applied to the joint between the adjacent integrated air barrier assemblies.

49. The building structure of any of embodiments 46-48, wherein the at least two integrated air barrier assemblies are disposed on an interior portion of one or more wall or roof panels of the building structure.

50. The building structure of any of embodiments 46-49, wherein the at least two integrated air barrier assemblies are disposed on an exterior portion of one or more wall or roof panels of the building structure.

51. The building structure of any of embodiments 46-50, wherein the integrated air barrier assemblies comprise a vapor impermeable barrier.

52. The building structure of embodiment 51, wherein the vapor impermeable barrier has a water vapor permeance less than 1 perm at a temperature of 23° C. and a relative humidity of 100% on one side and 50% on an opposite side, as measured by ASTM Test Method E 96 B (2010).

53. The building structure of any of embodiments 46-50, wherein the one or more integrated air barrier assemblies comprise a vapor permeable barrier.

54. The building structure of embodiment 53, wherein the vapor permeable barrier has a water vapor permeance greater than 10 perms at a temperature of 23° C. and a relative humidity of 100% on one side and 50% on an opposite side, as measured by ASTM Test Method E 96 B (2010).

55. A method of sheathing an exterior wall or roof of a building structure, comprising:
fastening at least two integrated air barrier assemblies of embodiment 1 to structural support elements of the building structure, with a transverse edge of one integrated air barrier assembly located proximate to a transverse edge of an adjacent integrated air barrier assembly to define a joint therebetween.

56. The method of embodiment 55, further comprising applying a tape or a liquid-applied coating or a combination thereof to the joint between the adjacent integrated air barrier assemblies.

57. The method of any of embodiments 55-56, further comprising attaching or more wall or roof panels to the structural support elements, wherein the one or more integrated air barrier assemblies are attached to the one or more wall or roof panels.

58. The method of any of embodiments 55-57, wherein the integrated barrier air assemblies are fastened to an exterior surface of the one or more wall or roof panels.

59. The method of any of embodiments 55-58, wherein the integrated barrier air assemblies are fastened to an interior surface of the one or more wall or roof panels.

60. The method of any of embodiments 55-59, wherein the board of each of the integrated air barrier assemblies comprises an insulating layer, and further comprising attaching a further layer of insulation to the one or more integrated barrier assemblies.

61. The method of any of embodiments 55-60, further comprising installing an exterior cladding layer over the one or more integrated air barrier assemblies.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. An integrated air barrier assembly comprising:
a board including a first surface and a second surface;
a fastener-sealing layer comprising a liquid-applied coating composition adhered on one of the first surface or the second surface of the board, wherein the fastener-sealing layer has a glass transition temperature of equal to or less than 40° F. such that the fastener-sealing layer is soft enough to seal around a shaft of a fastener and has a thickness ranging from 1 mils to 50 mils, wherein the liquid-applied coating composition comprises at least one of a liquid-applied latex, acrylic, vinyl acrylic, styrene acrylate, vinyl acetate, styrene-butadiene, carboxylated styrene-butadiene, vinylidene chloride, asphaltic emulsion, natural rubber, butyl, chloroprene, vinyl chloride-ethylene, and polyvinyl chloride; and
an anti-blocking facing layer adhered on a surface of the fastener-sealing layer opposite the board such that the fastener-sealing layer is disposed between the board and the anti-blocking facing layer, wherein the anti-blocking facing layer is chosen from a fiberglass mat, an aluminum foil, a fabric layer, or a paper layer, or a combination thereof,
wherein the assembly has an air leakage of less than 0.02 L/sec-m$^2$ as measured by ASTM Test Method E 2178 (2003) at a pressure difference of 75 Pa.

2. The integrated air barrier assembly of claim 1, wherein the anti-blocking facing layer is aluminum foil thus making the assembly water vapor impermeable characterized by having a water vapor permeance less than 1 perm at a temperature of 23° C. and a relative humidity of 100% on one side and 50% on an opposite side, as measured by ASTM Test Method E 96 B (2010).

3. The integrated air barrier assembly of claim 1, wherein the anti-blocking facing layer is the fiberglass mat, the fabric layer, or the paper layer thus making the assembly vapor permeable characterized by having a water vapor permeance of greater than 10 perms at a temperature of 23° C. and a relative humidity of 100% on one side and 50% on an opposite side, as measured by ASTM Test Method E 96 B (2010).

4. The integrated air barrier assembly of claim 1, wherein the assembly has an air leakage rate of greater than 75 Pa as measured by ASTM Test Method E 1186 (2003).

5. The integrated air barrier assembly of claim 1, wherein the fastener-sealing layer seals a penetration formed by a self-driving screw.

6. The integrated air barrier assembly of claim 1, wherein the fastener-sealing layer includes a plasticizer chosen from a phthalate, benzoate ester, polyether, polyester, adipate, polyetheramine, polyol, or epoxidized soybean oil, or a combination thereof.

7. The integrated air barrier assembly of claim 1, wherein the fastener-sealing layer is a composition applied as a hot melt, wherein the hot melt composition is chosen from a polyolefin, ethylene vinyl acetate, polyamide, polyurethane, asphaltic, butyl, or acrylic, or a combination thereof.

8. The integrated air barrier assembly of claim 1, wherein the fastener-sealing layer is a composition applied as a low molecular weight liquid that crosslinks to form a solid coating, the composition comprising a polyurethane, polyurea, acrylic, silicone, silyl terminated polyether, epoxy, or a combination thereof.

9. The integrated air barrier assembly of claim 1, wherein the anti-blocking facing layer is solid below at least 160° F.

10. The integrated air barrier assembly of claim 9, wherein the anti-blocking facing layer is the fiberglass mat comprising E glass fibers or S glass fibers embedded in a resin matrix chosen from a thermoset resin, thermoplastic resin, latex resin, polyester resin, amino resin, formaldehyde resin, epoxy resin, or a combination thereof.

11. The integrated air barrier of claim 1, wherein the anti-blocking facing layer is the aluminum foil having a thickness of 0.025 mm to 0.5 mm.

12. The integrated air barrier assembly of claim 1, wherein the anti-blocking facing layer comprises a radiant barrier disposed to redirect thermal radiation away from the fastener-sealing layer.

13. The integrated air barrier assembly of claim 1, wherein the anti-blocking facing layer is the paper layer comprising a coated paper.

14. The integrated air barrier assembly of claim 1, wherein the anti-blocking facing layer is the fabric layer chosen from a woven material, a non-woven material, a felt material or a spun bond material.

15. The integrated air barrier assembly of claim 1, wherein the anti-blocking facing layer is the fabric layer chosen from a polyethylene, polypropylene, or polyester non-woven fabric.

16. The integrated air barrier assembly of claim 1, wherein the board comprises an insulating layer having an R-value of at least 1.

17. The integrated air barrier assembly of claim 16, wherein the insulating layer comprises an insulating material chosen from a polyisocyanurate, expanded polystyrene, or extruded polystyrene, or a combination thereof.

18. The integrated air barrier assembly of claim 1, wherein the board comprises a wood layer chosen from oriented strand board, plywood, particle board, chip board, medium density fiberboard, wafer board, wood particles in laminate or non-laminate form, composites of strands and ply veneers, or composites of wood chips.

19. The integrated air barrier assembly of claim 1, wherein the board is chosen from a gypsum board, a concrete masonry unit, or a cementitious board.

20. The integrated air barrier assembly of claim 1 wherein the fastener-sealing layer has a glass transition temperature of equal to or less than 25° F.

21. The integrated air barrier assembly of claim 1 wherein the fastener-sealing layer has a glass transition temperature of equal to or less than 20° F.

22. A sheathing system for a building structure, comprising:
a wall or roof panel having an interior surface and an exterior surface; and
the integrated air barrier assembly of claim 1 secured to one of the exterior surface or the interior surface of the wall or roof panel.

23. A method of sheathing an exterior wall or roof of a building structure, comprising:
fastening at least two integrated air barrier assemblies of claim 1 to structural support elements of the building structure, with a transverse edge of one integrated air barrier assembly located proximate to a transverse edge of an adjacent integrated air barrier assembly to define a joint therebetween.

* * * * *